(12) United States Patent
Tsou et al.

(10) Patent No.: US 9,914,817 B2
(45) Date of Patent: Mar. 13, 2018

(54) POLYCYCLIC AROMATIC HYDROCARBON FUNCTIONALIZED ISOBUTYLENE COPOLYMERS FOR DISPERSING GRAPHENE AND GRAPHITE

(71) Applicant: ExxonMobil Chemical Patents Inc., Baytown, TX (US)

(72) Inventors: Andy H. Tsou, Houston, TX (US); Hillary L. Bradshaw, Houston, TX (US); Yong Yang, Kingwood, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 31 days.

(21) Appl. No.: 15/242,963

(22) Filed: Aug. 22, 2016

(65) Prior Publication Data
US 2017/0088688 A1 Mar. 30, 2017

Related U.S. Application Data

(60) Provisional application No. 62/235,116, filed on Sep. 30, 2015.

(51) Int. Cl.
| C08K 3/04 | (2006.01) |
| --- | --- |
| C08L 15/02 | (2006.01) |
| C08F 8/26 | (2006.01) |
| C08F 8/28 | (2006.01) |
| C08F 8/32 | (2006.01) |
| C08F 8/30 | (2006.01) |

(52) U.S. Cl.
CPC ............... C08K 3/04 (2013.01); C08K 3/046 (2017.05); C08L 15/02 (2013.01); C08F 8/26 (2013.01); C08F 8/28 (2013.01); C08F 8/30 (2013.01); C08F 8/32 (2013.01); C08K 3/042 (2017.05); C08K 3/045 (2017.05); C08L 2205/025 (2013.01); C08L 2666/55 (2013.01); C08L 2666/72 (2013.01)

(58) Field of Classification Search
CPC ...... C08F 8/20; C08F 8/24; C08F 8/26; C08F 8/28; C08F 8/30; C08F 8/32; C08L 25/04; C08L 23/20; C08L 23/22; C08L 23/26; C08L 23/28; C08L 23/283; C08L 2666/55; C08L 2666/72; C08L 2205/02; C08L 2205/025; C08L 15/02; C08K 2201/005; C08K 2201/011; C08K 3/04; C08K 3/042; C08K 3/041
See application file for complete search history.

(56) References Cited

U.S. PATENT DOCUMENTS

| 5,162,445 A | 11/1992 | Powers et al. |
| --- | --- | --- |
| 5,548,029 A | 8/1996 | Powers et al. |
| 5,741,864 A | 4/1998 | Patil |
| 5,824,717 A * | 10/1998 | Merrill ............... C08F 8/20 522/149 |
| 6,103,832 A | 8/2000 | Patil |
| 6,548,585 B1 | 4/2003 | Ozawa et al. |
| 7,923,491 B2 | 4/2011 | Weng et al. |
| 8,110,026 B2 | 2/2012 | Prud'Homme et al. |
| 2005/0031816 A1 | 2/2005 | Chang et al. |
| 2006/0229404 A1 | 10/2006 | Lechtenboehmer |
| 2010/0036023 A1* | 2/2010 | Weng ............... B60C 1/0008 524/13 |
| 2010/0096595 A1* | 4/2010 | Prud'Homme ........ B82Y 30/00 252/500 |

FOREIGN PATENT DOCUMENTS

| EP | 2 461 154 | 6/2012 | |
| --- | --- | --- | --- |
| WO | 92/11295 | 7/1992 | |
| WO | 2008/042025 | 4/2008 | |
| WO | WO 2008042025 A2 * | 4/2008 | ............... C08K 9/04 |
| WO | 2008/075010 | 6/2008 | |
| WO | WO 2008075010 A1 * | 6/2008 | ............ B82Y 30/00 |
| WO | 2010/016976 | 2/2010 | |
| WO | 2011/149603 | 12/2011 | |

OTHER PUBLICATIONS

Miklos Gyor et al, "Comb-like Triblock Copolymers by Wurtz-Grignard Coupling of Syndiotactic PMMA Anions to poly[(p-bromomethyl)styrene]-b-polyisobutylene-b-poly[(p-bromomethyl)styrene]", Polymer Bulletin, vol. 32, No. 2, (1994), pp. 155-162.
Jens Hag Truelsen et al, "Synthesis by ATRP of triblock copolymers with densely grafted styrenic end blocks from a polyisobutylene macroinitiator", Macromol. Rapid Commun., vol. 21, (2000), pp. 98-102.
Fonagy T. et al., "Polyisobutylene-graft-polystyrene by quasiliving atom transfer radical polymerization of styrene from poly(isobutylene-co-p-methylstyrene-co-p-bromomethylstyrene)", Macromol. Rapid Commun., vol. 19, (1998) pp. 479-483.
Nielsen, "*Models for the Permeability of Filled Polymer Systems*", J. Macrogol. Sci. (Chem.), vol. A1, pp. 929-942, 1967.
Gusev et al., "*Rational Design of Nanocomposites for Barrier Applications*", Advanced Materials, vol. 13, No. 12, pp. 1641-1643, 2001.

* cited by examiner

*Primary Examiner* — Satya Sastri

(57) ABSTRACT

Polycyclic aromatic hydrocarbon (PAH) functionalized isobutylene copolymers, methods for making a PAH functionalized isobutylene copolymer comprising combining a halogenated copolymer with a PAH in a solvent under basic conditions at a temperature ranging from 30° C. to 150° C., the use of these PAH functionalized copolymers as a dispersant in elastomeric nanocomposite compositions comprising a halobutyl rubber matrix and nanoparticles of graphite or graphene, and a tire innerliner or innertube produced from these elastomeric nanocomposite compositions is disclosed.

24 Claims, No Drawings

POLYCYCLIC AROMATIC HYDROCARBON FUNCTIONALIZED ISOBUTYLENE COPOLYMERS FOR DISPERSING GRAPHENE AND GRAPHITE

PRIORITY CLAIM

This application claims priority to U.S. Provisional Application No. 62/235,116 filed Sep. 30, 2015 the disclosure of which is incorporated herein by reference.

CROSS-REFERENCE TO RELATED APPLICATION

This application is related to concurrently filed U.S. Provisional Application No. 62/235,138 filed Sep. 30, 2015 entitled "COMB-BLOCK COPOLYMERS OF ISOBUTYLENE COPOLYMER BACKBONE WITH FUNCTIONAL POLYMER COMB ARMS," the disclosure of which is incorporated herein by reference.

FIELD OF THE INVENTION

The present invention relates to polycyclic aromatic hydrocarbon (PAH) functionalized isobutylene copolymers, the use of these copolymers as a dispersant in elastomeric nanocomposite compositions comprising a halobutyl rubber matrix and nanoparticles of graphite or graphene, and a tire innerliner or innertube produced from these elastomeric nanocomposite compositions.

BACKGROUND OF THE INVENTION

Halobutyl rubbers, which are halogenated isobutylene/isoprene copolymers, are the polymers of choice for best air retention in tires for passenger, truck, bus, and aircraft vehicles. Bromobutyl rubber, chlorobutyl rubber, and halogenated star-branched butyl rubbers can be formulated for specific tire applications, such as tubes or innerliners. The selection of ingredients and additives for the final commercial formulation depends upon the balance of the properties desired, namely, processability and tack of the green (uncured) compound in the tire plant versus the in-service performance of the cured tire composite. Examples of halobutyl rubbers are bromobutyl (brominated isobutylene-isoprene rubber or BIIR), chlorobutyl (chlorinated isobutylene-isoprene rubber or CIIR), star-branched butyl (SBB), EXXPRO™ elastomers (brominated isobutylene-co-p-methyl-styrene) copolymer (otherwise known as BIMSM), etc.

For rubber compounding applications, traditional small sub-micron fillers such as carbon black and silica are added to halobutyl rubbers to improve fatigue resistance, fracture toughness and tensile strength. More recently, methods to alter product properties and improve air barrier properties in halobutyl rubbers have been developed that comprise adding nanofillers apart from these traditional fillers to the elastomer to form a "nanocomposite." Nanocomposites are polymer systems containing inorganic particles with at least one dimension in the nanometer range (see, for example, WO 2008/042025).

Common types of inorganic particles used in nanocomposites are phyllosilicates, an inorganic substance from the general class of so called "nanoclays" or "clays" generally provided in an intercalated form wherein platelets or leaves of the clay are arranged in a stack in the individual clay articles with interleaf spacing usually maintained by the insertion of another compound or chemical species between the adjacent lamellae. Ideally, intercalation inserts into the space or gallery between the clay surfaces. Ultimately, it is desirable to have exfoliation, wherein the polymer is fully dispersed with the individual nanometer-size clay platelets.

The extents of dispersion, exfoliation, and orientation of platy nanofillers such as organosilicates, mica, hydrotalcite, graphitic carbon, etc., strongly influence the permeability of the resulting polymer nanocomposites. The barrier property of a polymer in theory is significantly improved, by an order of magnitude, with the dispersion of just a few volume percent of exfoliated high aspect-ratio platy fillers, due simply to the increased diffusion path lengths resulting from long detours around the platelets. Nielsen, *J. Macromol. Sci. (Chem.)*, vol. A1, p. 929 (1967), discloses a simple model to determine the reduction in permeability in a polymer by accounting for the increase in tortuosity from impenetrable, planarly oriented platy fillers. Gusev et al., *Adv. Mater.*, vol. 13, p. 1641 (2001), discloses a simple stretched exponential function relating the reduction of permeability to aspect ratio times volume fraction of the platy filler that correlates well with permeability values numerically simulated by direct three-dimensional finite element permeability calculations.

To maximize the effect of aspect ratio on permeability reduction, it is therefore useful to maximize the degree of exfoliation and dispersion of the platelets, which are generally supplied in the form of an intercalated stack of the platelets. However, in isobutylene polymers, dispersion and exfoliation of platy nanofillers requires sufficient favorable enthalpic contributions to overcome entropic penalties. As a practical matter, it has thus proven to be very difficult to disperse ionic nanofillers such as clay into generally inert, nonpolar, hydrocarbon elastomers. The prior art has, with limited success, attempted to improve dispersion by modification of the clay particles, by modification of the rubbery polymers, by the use of dispersion aids, and by the use of various blending processes.

Due to the difficulties encountered in dispersing ionic nanoclays in nonpolar elastomers, graphitic carbon has been explored as an alternative platy nanofiller. For example, elastomeric compositions comprising graphite nanoparticles are described in U.S. Pat. No. 7,923,491.

US 2006/0229404 discloses a method for making compositions of an elastomer with exfoliated graphite in which the diene monomers are polymerized in the presence of 10 phr or more exfoliated graphite so that the graphite is intercalated with the elastomer.

U.S. Pat. No. 8,110,026 describes a process for producing a functional graphene sheet (FGS) based on exfoliation of oxidized graphite suitable for a high degree of dispersion in a polymer matrix for use in a nanocomposite.

Nano graphene platelets (NGPs) obtained through rapid expansion of graphite have become commercially available as of late. These NGPs have graphitic surfaces, as opposed to graphene oxide platelets of oxidized graphitic surfaces, and are quite compatible with hydrocarbon based non-polar butyl halobutyl rubbers. However, a high degree of exfoliation and dispersion of NGPs without agglomerations and aggregations cannot be achieved by solid compounding or solution mixing of these nanoparticles into halobutyl rubbers.

There is a need, therefore, for improving the dispersion of graphite and graphene nanofillers in elastomeric nanocomposite compositions comprising halobutyl rubbers useful for tires, air barriers, and other things requiring air retention, in order to improve the air impermeability of those compositions. The present invention fulfills this need by providing a novel graphite and graphene nanofiller dispersant useful in isobutylene-based elastomer/nanofiller nanocomposite compositions that results in these nanocomposite compositions having improved air barrier properties and that are suitable for use as a tire innerliner or innertube.

SUMMARY OF THE INVENTION

This invention relates to a nanofiller dispersant composition and a method for producing the same. The nanofiller dispersant composition comprises the reaction product of at least one halogenated copolymer comprising units derived from isoolefins having from 4 to 7 carbons and a para-alkylstyrene, and at least one polycyclic aromatic hydrocarbon (PAH).

The method for making the nanofiller dispersant composition comprises combining at least one halogenated copolymer comprising units derived from isoolefins having from 4 to 7 carbons and a para-alkylstyrene, and at least one PAH. For example, the at least one halogenated copolymer and the at least one PAH can be combined in a solvent under basic conditions at a temperature ranging from 30° C. to 150° C. The invention further relates to an elastomeric nanocomposite composition comprising a nanofiller dispersant, at least one halogenated elastomer, and at least one nanofiller. The nanofiller dispersant comprises the reaction product of at least one halogenated copolymer comprising units derived from isoolefins having from 4 to 7 carbons and a para-alkylstyrene, and at least one PAH. The at least one halogenated elastomer comprises units derived from isoolefins having from 4 to 7 carbons, and preferably comprises units derived from at least one multiolefin. The at least one nanofiller is present at from 0.01 wt % to 15.0 wt % based on the weight of the uncompounded nanocomposite.

DETAILED DESCRIPTION OF THE INVENTION

This invention(s) describes polycyclic aromatic hydrocarbon (PAH) functionalized isobutylene copolymers useful as a nanofiller dispersant in isobutylene-based elastomer/nanofiller nanocomposite compositions. The nanocomposite composition can include a halogenated isobutylene-based elastomer and a nanofiller, desirably either graphite or graphene, suitable for use as an air barrier. The nanocomposite composition formed of this invention has improved air barrier properties and is suitable for use as an innerliner or innertube.

Definitions

As used herein, "polymer" may be used to refer to homopolymers, copolymers, interpolymers, terpolymers, etc. Likewise, a copolymer may refer to a polymer comprising at least two monomers, optionally with other monomers. As used herein, when a polymer is referred to as "comprising" a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "nanoparticle" or "nanofiller" refers to an inorganic particle with at least one dimension (length, width, or thickness) of less than 100 nanometers.

As used herein, "elastomeric nanocomposite" or "elastomeric nanocomposite composition" refers to any elastomer or elastomeric composition further comprising nanofiller and, optionally, a thermoplastic resin.

As used herein, "phr" is parts per hundred rubber and is a measure common in the art wherein components of a composition are measured relative to a major elastomer component, based upon 100 parts by weight of the elastomer(s) or rubber(s).

As used herein, "compounding" refers to combining an elastomeric nanocomposite composition with other ingredients apart from nanofiller and thermoplastic resin. These ingredients may include additional fillers, curing agents, processing aids, accelerators, etc.

As used herein, "isobutylene based elastomer" or "isobutylene based polymer" or "isobutylene based rubber" refers to elastomers or polymers comprising at least 70 mole percent isobutylene.

As used herein, "isoolefin" refers to any olefin monomer having at least one olefinic carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "exfoliation" refers to the separation of individual layers of the original inorganic particle, so that polymer can surround or surrounds each separated particle. Preferably, sufficient polymer or other material is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

The term "aspect ratio" is understood to mean the ratio of the larger dimension of the leaves or platelets of nanofiller, to the thickness of the individual leaf or of the agglomerate or stack of leaves or platelets. The thickness of the individual leaf/platelet can be determined by crystallographic analysis techniques, whereas the larger dimension of a leaf/platelet are generally determined by analysis by transmission electron microscopy (TEM), both of which are known in the art.

The term "average aspect ratio" refers to the volume average aspect ratio, i.e., the third moment of the aspect ratio distribution, unless otherwise indicated.

As used herein, "solvent" refers to any substance capable of dissolving another substance. When the term solvent is used it may refer to at least one solvent or two or more solvents unless specified. The solvent can be polar. Alternatively, the solvent can be non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "hydrocarbon" refers to molecules or segments of molecules containing primarily hydrogen and carbon atoms. Hydrocarbon also includes halogenated versions of hydrocarbons and versions containing heteroatoms as discussed in more detail below.

As used herein, "polycyclic aromatic hydrocarbon" (PAH) refers to hydrocarbon compounds containing multiple aromatic rings.

As used herein, "polynuclear aromatic hydrocarbon" refers to a polycyclic aromatic hydrocarbon molecule having fused aromatic rings that share one or more sides.

Functionalized Copolymer Nanofiller Dispersant

The PAH functionalized copolymer nanofiller dispersants of this invention preferably consist essentially of the product of a nucleophilic substitution reaction between a halogenated copolymer electrophile and a PAH nucleophile. Other direct transformation routes for preparing the PAH functionalized copolymers from a halogenated copolymer and a PAH include, but are not limited to, a Barbier reaction between the halogenated copolymer and a PAH comprising an aldehyde functional group, and a carbonation reaction between the halogenated copolymer, a PAH comprising an alcohol functional group, and carbon dioxide. The PAH functionalized copolymers can also be prepared through multi-step transformations that involve derivatizing butyl polymers and/or readily available PAH compounds to reaction counterparts that can be covalently coupled together. For example, a PAH comprising an alkyl functional group can be oxidized to form a PAH comprising a carboxylic acid functional group, which can subsequently undergo nucleophilic substitution with the halogenated copolymer.

Alternatively, the PAH functionalized copolymers can be prepared through transformation routes that do not include a halogenated copolymer. For example, the PAH functionalized copolymers can be formed by cationically co-polymerizing isobutylene, vinyl pyrene, and paramethylstyrene, or Friedel Crafts alkylation can be used to attach vinyl pyrene to a non-halogenated isobutylene-paramethylstyrene copolymer.

The resulting inventive PAH functionalized copolymers are useful for dispersing graphite or graphene nanoparticles in a halobutyl matrix based elastomeric nanocomposite. Without wishing to be bound by theory, it is believed that the inventive copolymers herein operate as a graphite or graphene nanofiller dispersant by preferentially attaching to graphite or graphene surfaces through phi-phi* interaction between the aromatic rings of the PAH and the graphitic surface of the graphite or graphene nanoparticles.

The preparation of the PAH functionalized copolymers by the nucleophilic substitution reaction between a halogenated copolymer electrophile and a PAH nucleophile will now be described in more detail. The invention is not limited to these aspects, and this description is not meant to foreclose other aspects within the broader scope of the invention, for example, where the copolymers are prepared through one of the alternative transformation routes described above.

Halogenated Copolymer Electrophile

In any embodiment, the electrophile which forms a base polymer for the functionalized copolymers useful as nanofiller dispersants in accordance with this invention is a copolymer of an isoolefin having from 4 to 7 carbon atoms and a para-alkylstyrene having the formula:

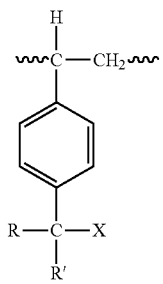

(I)

wherein X is a halogen and R and R' are independently selected from the group consisting of hydrogen, alkyl, and primary and secondary alkyl halides. It has been discovered that the benzylic-halide moiety in these electrophiles can now be readily used in a nucleophilic substitution reaction with a polycyclic aromatic hydrocarbon (PAH) nucleophile to produce the PAH functionalized copolymers hereof.

Most useful of such halogenated copolymer materials are elastomeric random interpolymers of isobutylene and from 0.5 to 20 mol % alkylstyrene, preferably p-methylstyrene, wherein up to 60 mol % of the methyl substituent groups present on the benzyl ring contain a bromine or chlorine atom, preferably a bromine atom (p-bromomethylstyrene). These interpolymers are termed "halogenated poly(isobutylene-co-p-methylstyrene)" or "brominated poly(isobutylene-co-p-methylstyrene)," and are commercially available under the name EXXPRO™ Elastomers (ExxonMobil Chemical Company, Houston, Tex.). It is understood that the use of the terms "halogenated" or "brominated" are not limited to the method of halogenation of the copolymer, but merely descriptive of the copolymer which can include the isobutylene derived units, the p-methylstyrene derived units, and the p-halomethylstyrene derived units.

These halogenated copolymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 3.5, a preferred viscosity average molecular weight in the range of from 200,000 up to 2,000,000 and a preferred number average molecular weight in the range of from 25,000 to 750,000 as determined by gel permeation chromatography.

The halogenated copolymers can be prepared by a slurry polymerization of the monomer mixture using a Lewis acid catalyst, followed by halogenation, preferably bromination, in solution in the presence of halogen and a radical initiator such as heat and/or light and/or a chemical initiator. Preferred halogenated poly(isobutylene-co-alkylstyrene), preferably halogenated poly(isobutylene-co-p-methylstyrene), are brominated polymers which generally contain from 0.1 to 5 wt % of bromomethyl groups. Preferably, the amount of bromomethyl groups is from 0.2 to 2.5 wt %. Expressed another way, preferred copolymers contain from 0.05 up to 2.5 mol % of bromine, based on the weight of the polymer, more preferably from 0.1 to 1.25 mol % bromine, and are substantially free of ring halogen or halogen in the polymer backbone chain. Often, the interpolymer is a copolymer of $C_4$ to $C_7$ isomonoolefin derived units and alkylstyrene, preferably a p-methylstyrene, derived units and preferably a p-halomethylstyrene derived units, wherein the p-halomethylstyrene units are present in the interpolymer from 0.4 to 1 mol % based on the interpolymer. Preferably, the p-halomethylstyrene is p-bromomethylstyrene. The Mooney Viscosity (1+8, 125° C., ASTM D1646, modified) is from 20 to 80 MU.

PAH Nucleophile

The halogenated copolymers described above are functionalized with a polycyclic aromatic hydrocarbon (PAH) nucleophile. Preferred PAH nucleophiles are polynuclear aromatic hydrocarbons (PNAs), that is molecules having fused aromatic rings that share one or more sides. More specifically, preferred PNAs have from 3 to 12 fused aromatic rings, such as anthracenes, pyrenes, benzopyrenes, coronenes, and ovalenes.

Preferably, the PAH nucleophile includes a functional group. Suitable functional groups include, but are not limited to, amines, alcohols, phosphines, aldehydes, alkoxides, alkenes, carboxylic acids, thiols, acid halides, acid anhydrides, aziridines, epoxides, and amides. More specifically, preferred PAHs include functional pyrenes with alkyl amine, alkyl alcohol, alkoxide, or cyano groups.

A representative reaction between a halogenated copolymer electrophile and a PAH nucleophile having a suitable functional group is shown by the reaction between BIMSM and pyrene butanol below:

wherein a, b, and c each represent a polymeric unit that is repeated within the interpolymer.

Preferably, in order to avoid or minimize gel formation, the nucleophile is monofunctional. Thus, for instance, suitable functional groups include secondary amines, but not primary amines. A representative reaction between a halogenated copolymer electrophile and a PAH nucleophile having a primary amine functional group is shown by the reaction between BIMSM and aminomethylpyrene below:

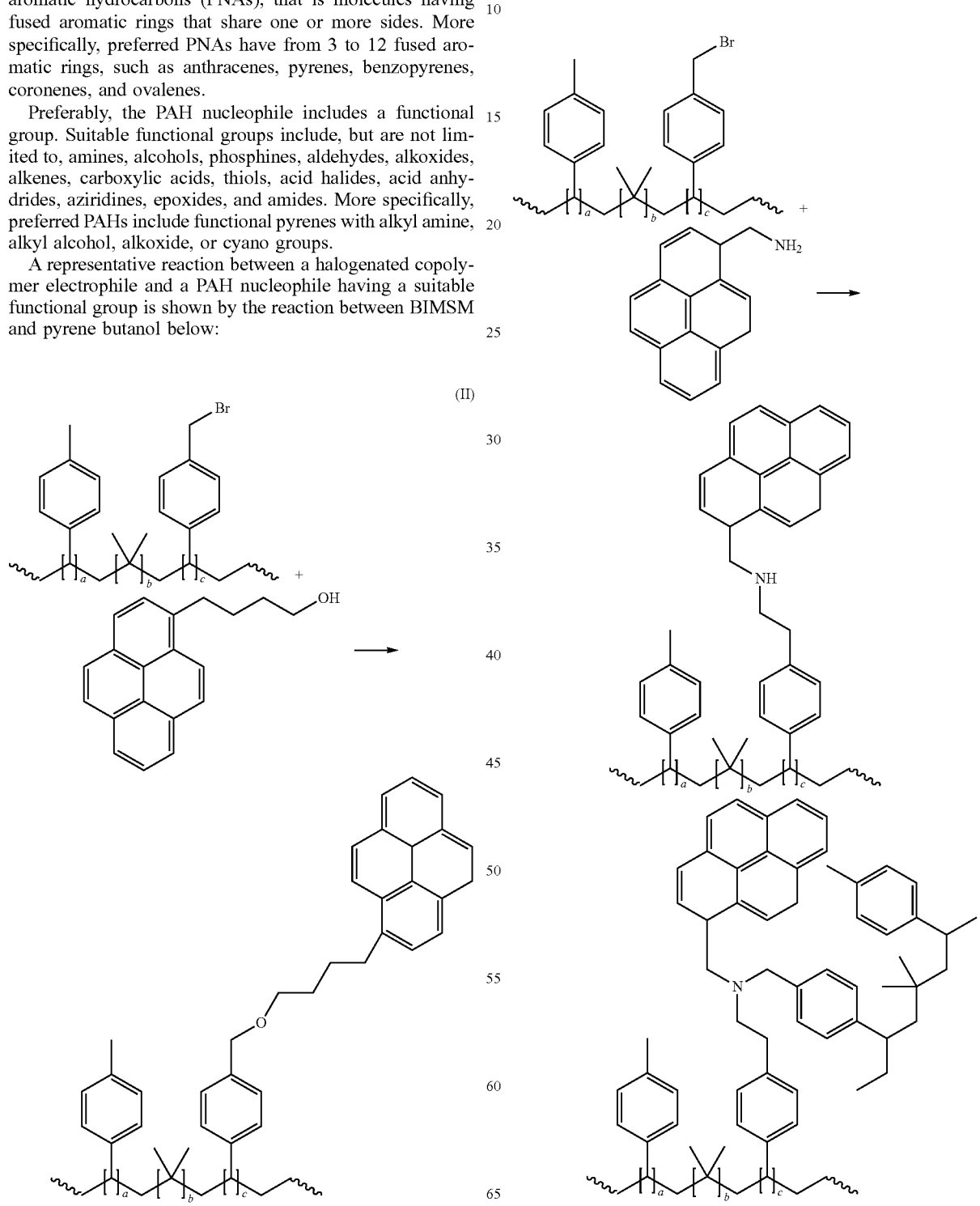

wherein a, b, and c each represent a polymeric unit that is repeated within the interpolymer.

The amount of the PAH nucleophilic reagent can be selected based on the desired amount of grafting with the halogenated electrophilic copolymer. Preferably, the molar ratio of the PAH nucleophilic reagent to the benzylic-halide moiety of the electrophile ranges from 0.5 to 2.0, more preferably from 0.8 to 1.5. Preferably, the amount of grafting of the PAH with the halogenated electrophilic copolymer, corresponding to the percentage of the benzylic bromine functionality in the halogenated electrophilic copolymer that covalently bonds with the PAH, ranges from 4% to 80%, preferably from 10% to 75%, more preferably from 15% to 70%.

Nucleophilic Substitution Reaction Conditions

The specific conditions suitable for preparing the various PAH functionalized copolymers of this invention will vary depending upon the structure of the PAH being introduced, as well as the base polymer composition and other factors. Specific examples are disclosed herein, and some general reaction conditions can also be defined. The nucleophilic substitution reactions can be run in solution using a solvent system in which both the base polymer electrophile and nucleophilic PAH reagent are soluble; can be run in a two phase liquid run system with the base polymer electrophile dissolved in one phase and the nucleophilic PAH reagent in the other; can be run in a two phase solid/liquid system (i.e., with the base polymer electrophile dispersed in a liquid phase containing the PAH nucleophilic reagent); or can be run in the bulk with reactants dissolved or dispersed in the base polymer electrophile. The common solution situation is most controllable and generally the preferred case, but the bulk reaction may be economically advantageous in some cases where suitable reagents and reaction conditions can be found. The intermediate two phase systems may be advantageous under some circumstances and may be necessary in instances where the solubility parameters of the base polymer electrophile and the nucleophilic PAH reagent are so different that no common solvents exist. In these two phase cases, it is often or usually desirable to use phase transfer catalysts to promote the nucleophilic substitution reaction at the interface between the phases or to transport the nucleophilic reagent to the electrophile site in the base polymer. One way of preparing the PAH functionalized polymers of this invention is to radically halogenate a random isobutylene/para-methylstyrene copolymer to introduce the benzylic halogen electrophile and then conduct the nucleophilic substitution reaction to introduce the desired new PAH in the same medium in a sequential reaction (halogenate and then nucleophically displace the halogen) without ever recovering the base halogenated polymer separately.

Depending upon the reactivity of the nucleophilic PAH reagent used and the reaction conditions, the nucleophilic substitution reactions can be run at temperatures varying from about 0° C. to about 200° C. as limited by thermal stability of the nucleophilic PAH reagent, the base polymer electrophile and the PAH functionalized product polymer. Normally, temperatures between about 0° and about 150° C. are preferred, preferably from 30° C. to 150° C. Reaction times are normally (but not necessarily) chosen to allow the nucleophilic displacement reaction to go to completion (i.e., exhaustion of either the electrophile or the nucleophilic reagent) and may range between several seconds and a few days. Normally, reaction times between a few minutes and several hours are preferred and reaction temperature and other conditions are set to make a convenient reaction time possible.

A wide range of solvents and/or solvent blends may be used as the medium in which the nucleophilic displacement reaction is run and it is this factor which determines whether a solution, dispersion, or bulk reaction is conducted. The solvents need to provide a reaction environment which is favorable for the reaction being run that is, they must bring the reactants into the required intimate solution contact and should provide solvation stabilization for intermediate states along the desired reaction route. It is frequently necessary or desirable to use a blend of solvents to best achieve the various compromises required, with one solvent being an easily handled "good" solvent for the base polymer electrophile and the other being a "good" solvent for the nucleophilic PAH reagent and/or providing solvation stabilization for the reaction intermediates. In sequential reaction routes, it is preferred that the chosen solvent system be one that is suitable for both the radical halogenation reaction to introduce the benzylic halogen electrophile into the random isobutylene/paramethylstyrene copolymer, as well as for the nucleophilic substitution reaction to introduce the new PAH functionality, so that a sequential reaction route is feasible without having to recover the halogenated "base" polymer separately.

Solvents which are particularly suited for this sequential reaction route vary somewhat depending upon composition of the "base" polymer electrophile, but with the elastomeric "base" polymers high in isobutylene are low boiling saturated aliphatic hydrocarbons ($C_4$ to $C_8$) or halogenated aliphatic hydrocarbons ($C_1$ to $C_8$). Often it is desirable to add a more polar cosolvent, such as a low boiling alcohol ($C_1$ to $C_4$) during the (second) nucleophilic displacement reaction in order to dissolve and "carry-in" the nucleophilic PAH reagent as well as provide solvation stabilization for the nucleophilic displacement reaction. Aromatic solvents such as benzene, toluene, and chlorobenzene are generally good solvents for the base polymer electrophile over the entire composition range and provide a reaction medium favorable for many nucleophilic displacement reactions but often present other problems (i.e., the toxicity of benzene or the high reactivity of toluene during radical halogenation which makes it unsuitable as the reaction medium during this first stage of the sequential reaction route). Preferred solvent composition changes as composition of the base polymer electrophile is changed and depends upon whether it is desired to run the reactions in solution or dispersion. In general, solvents having a higher Hildebrand solubility parameter containing some aromaticity or halogen (e.g., solubility parameter greater than 8.6 $cal^{1/2}$ $cm^{-3/2}$) are required for solution reactions with the tougher, higher Tg base polymers of this invention which contain higher paramethylstyrene contents.

Similar considerations apply when considering the nucleophilic displacement reaction separately. In order to run this reaction in solution, a good solvent for the base polymer electrophile (depending upon its composition) is required and a cosolvent for the nucleophilic PAH reagent may also be desirable or required. Good solvents for the base polymer electrophile are similar to those cited above as being suitable for the sequential reaction route, but a broader range of solvents can be considered since inertness during radical halogenation is not required. Low boiling saturated aliphatic hydrocarbons ($C_4$ to $C_8$), such as hexane, isohexane, and heptane, or halogenated aliphatic hydrocarbons ($C_1$ to $C_8$), or aryl hydrocarbons ($C_6$ to $C_{20}$), or halogenated aryl hydrocarbons ($C_6$ to $C_{20}$) or naphthenes are preferred. Where greater solvent polarity is desired tetrahydrofuran can be employed or good solvating agents such as dimethyl foramide or dimethyl sulfide can be added. The latter solvents are also good solvents for many of the nucleophilic PAH reagents and may be employed along with alcohols or ketones to dissolve the nucleophilic PAH reagent for addition to the base polymer electrophile solution. This technique of adding a solution of the nucleophilic PAH reagent (in a solvent miscible with that used for the base polymer) with rapid stirring to the base polymer electrophile solution often results in a fine dispersion of the nucleophilic PAH reagent so that even in cases where the nucleophilic PAH reagent is not completely soluble in the mixed solvent resulting after the addition, an essential solution nucleophilic displacement reaction can still be run because the nucleophilic PAH reagent dissolves during reaction to replenish the solution concentration as the reaction progresses.

In more extreme cases, where the nucleophilic PAH reagent isn't soluble in co-solvents miscible with the base polymer electrophile solvent or where the solubility of the nucleophilic PAH reagent in mixed solicity which will retain the base polymer electrophile in solution is too low, then a two phase reaction may be run with the base polymer electrophile dissolved in one phase and the nucleophilic PAH reagent in the other. In such cases, good mixing is essential to provide lots of interfacial contact between the reactants and a phase transfer catalyst is generally desirable to aid in transporting the nucleophilic reagent to the benzylic halogen electrophile site on the base polymer. Examples of phase transfer catalysts useful in these two phase reactors include (but are not limited to): tetrabutyl ammonium bromide, tetrabutyl ammonium bisulfate, tetrabutyl ammonium hydroxide, benzyl triethyl ominonium chloride, tetrabutyl phosphonium bromide, crown ethers, cyptonds, Adogen™ 464, etc. These same types of materials are sometimes beneficial in speeding up the one-phase solution reaction by providing specific solvation at the reaction site.

Preferably, the PAH nucleophilic reagent is anionic under the reaction conditions. Thus, the nucleophilic substitution reaction is preferably performed under basic conditions. Preferably, the base is selected in accordance with the strength necessary to deprotonate the PAH nucleophile. Suitable bases are those capable of deprotonation but that are themselves poor nucleophiles (i.e., "non-nucleophilic bases"). Representative bases include bulky amines, phosphines, and heterocycles (e.g., N,N-diisopropylethylamine, 1,8-diazabicycloundec-7-ene, and 2,6-di-tert-butylpyridine). Other suitable inorganic bases include, but are not limited to, sodium or potassium hydride/tert-butoxide, metal carbonates or oxides, lithium diisopropylamide, sodium or potassium bis(trimethylsilyl)amide, lithium tetramethylpiperidide, calcium hydroxide, sodium hydroxide, sodium amide, titanium chloride, and magnesium hydroxide.

Elastomeric Nanocomposite

The uncompounded elastomeric nanocomposite composition can include up to 49 wt % nanofiller dispersant (e.g., based on the total weight of the nanofiller dispersant, elastomer component, and nanofiller). The uncompounded elastomeric nanocomposite composition can contain from 0.5 to 45 wt % nanofiller dispersant. Preferably, the uncompounded elastomeric nanocomposite composition contains from 2 to 35 wt % nanofiller dispersant. More preferably, the uncompounded elastomeric nanocomposite composition contains from 5 to 30 wt % nanofiller dispersant. Ideally, the uncompounded elastomeric nanocomposite composition contains from 10 to 25 wt % nanofiller dispersant.

In addition to the nanofiller dispersant, the elastomeric nanocomposite composition includes at least one additional elastomer component and at least one nanofiller component. Optionally, the elastomeric nanocomposite composition further includes one or more thermoplastic resins. Optionally, the elastomeric nanocomposite composition is compounded and further includes some or all of the following components: processing aids, additional fillers, and curing agents/accelerators.

Elastomer Component

The elastomer component or parts thereof is halogenated. Preferred halogenated rubbers include bromobutyl rubber, chlorobutyl rubber, brominated copolymers of isobutylene and para-methylstyrene, and mixtures thereof. Halogenated butyl rubber is produced by the halogenation of butyl rubber product. Halogenation can be carried out by any means, and the invention is not herein limited by the halogenation process. Often, the butyl rubber is halogenated in hexane diluent at from 4 to 60° C. using bromine ($Br_2$) or chlorine ($Cl_2$) as the halogenation agent. The halogenated butyl rubber has a Mooney Viscosity of from 20 to 80 (ML 1+8 at 125° C.), or from 25 to 60. The halogen wt % is from 0.1 to 10 wt % based on the weight of the halogenated butyl rubber, or from 0.5 to 5 wt %. Preferably, the halogen wt % of the halogenated butyl rubber is from 1 to 2.5 wt %.

A suitable commercial halogenated butyl rubber is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084). Another commercial example of the halogenated butyl rubber is Bromobutyl 2255 (ExxonMobil Chemical Company). Its Mooney Viscosity is from 41 to 51 (ML 1+8 at 125° C., ASTM D1646), and the bromine content is from 1.8 to 2.2 wt %. Further, cure characteristics of Bromobutyl 2255 are as follows: MH is from 34 to 48 dN·m, ML is from 11 to 21 dN·m (ASTM D2084).

The elastomer can include a branched or "star-branched" halogenated butyl rubber. The halogenated star-branched butyl rubber ("HSBB") often includes a composition of a butyl rubber, either halogenated or not, and a polydiene or block copolymer, either halogenated or not. The invention is not limited by the method of forming the HSBB. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited to the type of polydiene used to make the HSBB.

The HSBB can be a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, in an amount greater than 0.3 wt %, or from 0.3 to 3 wt %, or from 0.4 to 2.7 wt %.

A commercial example of the HSBB is Bromobutyl 6222 (ExxonMobil Chemical Company), having a Mooney Viscosity (ML 1+8 at 125° C., ASTM D1646) of from 27 to 37, and a bromine content of from 2.2 to 2.6 wt % relative to the HSBB. Further, cure characteristics of Bromobutyl 6222 are as follows: MH is from 24 to 38 dN·m, ML is from 6 to 16 dN·m (ASTM D2084).

The elastomer component can be an isoolefin copolymer comprising a halomethylstyrene derived unit. The halomethylstyrene unit can be an ortho-, meta-, or para-alkyl-substituted styrene unit. The halomethylstyrene derived unit can be a p-halomethylstyrene having at least 80%, more preferably at least 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin of the copolymer can be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer can also further include one or more multiolefin derived units. The multiolefin can be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, etc. Desirable styrenic monomer derived units that may comprise the copolymer include styrene, methylstyrene, chlorostyrene, methoxystyrene, indene and indene derivatives, and combinations thereof.

The elastomer component can be selected from the same class of compounds suitable for the halogenated copolymer electrophile, especially EXXPRO™ Elastomers. The compositional distributions and preparation methods for these compounds are described above in reference to the electrophile.

The elastomer component can include various amounts of one, two, or more different elastomers. For example, compositions described may contain from 5 to 100 phr of halogenated butyl rubber, from 5 to 95 phr of star-branched butyl rubber, from 5 to 95 phr of halogenated star-branched butyl rubber, or from 5 to 95 phr of halogenated poly (isobutylene-co-alkylstyrene), preferably halogenated poly (isobutylene-co-p-methylstyrene). For example, the compositions can contain from 40 to 100 phr of halogenated poly(isobutylene-co-alkylstyrene), preferably halogenated poly(isobutylene-co-p-methylstyrene), and/or from 40 to 100 phr of halogenated star-branched butyl rubber (HSBB).

The elastomer component can include natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; and poly(isobutylene-co-alkyl styrene), preferably isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof.

The elastomer component described herein may further comprise a secondary elastomer component selected from the group consisting of natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; and isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof. Alternatively, the elastomeric composition described herein has less than 10 phr, preferably 0 phr of a secondary elastomer component, preferably 0 phr of the elastomers described above as "secondary elastomer component."

The elastomer component can include one or more semi-crystalline copolymers (SCC). Semi-crystalline copolymers are described in U.S. Pat. No. 6,326,433. Generally, the SCC is a copolymer of ethylene or propylene derived units and α-olefin derived units, the α-olefin having from 4 to 16 carbon atoms, and can be a copolymer of ethylene derived units and α-olefin derived units, the α-olefin having from 4 to 10 carbon atoms, wherein the SCC has some degree of crystallinity. The SCC can also be a copolymer of a 1-butene derived unit and another α-olefin derived unit, the other α-olefin having from 5 to 16 carbon atoms, wherein the SCC also has some degree of crystallinity. The SCC can also be a copolymer of ethylene and styrene.

The uncompounded elastomeric nanocomposite composition can include up to 99 wt % of the one or more elastomeric components or elastomers (e.g., based on the total weight of the nanofiller dispersant, elastomer component, and nanofiller). The uncompounded elastomeric nanocomposite composition can contain from 30 to 99 wt % of the one or more elastomeric components or elastomers. Preferably, the uncompounded elastomeric nanocomposite composition contains from 35 to 90 wt % of the one or more elastomeric components or elastomers. More preferably, the uncompounded elastomeric nanocomposite composition contains from 40 to 85 wt % of the one or more elastomeric components or elastomers. More preferably, the uncompounded elastomeric nanocomposite composition contains from 40 to 80 wt % of the one or more elastomeric components or elastomers. Ideally, the uncompounded elastomeric nanocomposite composition can contains from 40 to 60 wt % of the one or more elastomeric components or elastomers.

Thermoplastic Resin

The elastomeric nanocomposite composition can include one or more thermoplastic resins. Suitable thermoplastic resins include polyolefins, nylons, and other polymers. Suitable thermoplastic resins can be or include resins containing nitrogen, oxygen, halogen, sulfur or other groups capable of interacting with one or more aromatic functional groups such as a halogen or acidic groups.

Suitable thermoplastic resins include polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

The elastomeric nanocomposite composition can include any of the thermoplastic resins (also referred to as a thermoplastic or a thermoplastic polymer) described above that are formed into dynamically vulcanized alloys. The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

A further description of suitable thermoplastic resins and dynamically vulcanized alloys is available in U.S. Pat. No. 7,923,491, which is hereby incorporated by reference.

The uncompounded elastomeric nanocomposite composition can include up to 49 wt % thermoplastic resin (e.g., based on the total weight of the nanofiller dispersant, elastomer, nanofiller, and thermoplastic resin). The uncompounded elastomeric nanocomposite composition can contain from 0.5 to 45 wt % thermoplastic resin. Preferably, the uncompounded elastomeric nanocomposite composition contains from 2 to 35 wt % thermoplastic resin. More preferably, the uncompounded elastomeric nanocomposite composition contains from 5 to 30 wt % thermoplastic resin. Ideally, the uncompounded elastomeric nanocomposite composition contains from 10 to 25 wt % thermoplastic resin.

Nanofillers

The elastomeric nanocomposite composition typically includes nanoparticles of graphite (preferably graphene). The nanoparticles have at least one dimension (length, width or thickness) of less than 100 nanometers. Alternately two dimensions (length, width or thickness) are less than 100 nanometers, alternately all three dimensions (length, width and thickness) are less than 100 nanometers. Preferably, the nanoparticle is a sheet having a thickness of less than 100 nanometers and a length and or width that is at least 10 times greater than the thickness (preferably 20 to 500 times, preferably 30 to 500 times the thickness). Alternatively, the graphite has a shape that is needle-like or plate-like, with an aspect ratio greater than 1.2 (preferably greater than 2, preferably greater than 3, preferably greater than 5, preferably greater than 10, preferably greater than 20), where the aspect ratio is the ratio of the longest dimension to the shortest dimension (length, width, and thickness) of the particles, on average. Alternatively, the graphite is pulverized. Useful graphites may have a specific surface area of 10 to 2000 $m^2/g$, preferably from 50 to 1000 $m^2/g$, preferably from 100 to 900 $m^2/g$.

Preferably, the uncompounded nanocomposite contains 0.01 wt % to 15.0 wt % graphite (preferably graphene) nanoparticles (e.g., based on the total weight of the nanofiller dispersant, elastomer, and nanofiller). More preferably, the uncompounded nanocomposite contains 0.05 wt % to about 10.0 wt % graphite (preferably graphene) nanoparticles. More preferably, the uncompounded nanocomposite contains from about 0.1 wt % to about 10.0 wt %; from about 0.5 wt % to about 10.0 wt %; from about 1.0 wt % to about 10.0 wt % graphite (preferably graphene) nanoparticles. Ideally, the uncompounded nanocomposite contains from a low of about 0.05 wt %, 0.5 wt % or 1.2 wt % to a high of about 5.0 wt %, 7.5 wt %, or 10.0 wt % graphite (preferably graphene) nanoparticles.

Preferably, the graphite (preferably graphene) has up to 50 wt % present in the beta form, typically form 5 to 30 wt %. Alternatively, the graphite (preferably graphene) is present in the alpha form, having typically less than 1 wt % beta form, preferably 0 wt % beta form.

The graphite is preferably in the form of nano graphene platelets (NGPs) obtained through rapid expansion of graphite. Expanded graphite can typically be made by immersing natural flake graphite in a bath of acid (such as sulphuric acid, nitric acid, acetic acid, and combinations thereof, or the combination of chromic acid, then concentrated sulfuric acid), which forces the crystal lattice planes apart, thus expanding the graphite.

Preferably, the expandable graphite may have one or more of the following properties (before expansion): a) particle size of 32 to 200 mesh, (alternately a median particle diameter of 0.1 to 500 microns (alternately 0.5 to 350 microns, alternately 1 to 100 microns)), and/or b) expansion ratio of up to 350 cc/g, and/or c) a pH of 2 to 11, (preferably 4 to 7.5, preferably 6 to 7.5). Expandable graphite can be purchased from GRAFTech International or Asbury Carbons, Anthracite Industries, among others. Particularly useful expandable graphite includes GRAFGUARD™ Expandable Graphite Flakes. Expanded graphite can be further milled for the production of NGPs, as described in U.S. Pat. No. 7,550,529, with a thickness ranging from 1 to 20 nanometers and width ranging from 1 to 50 microns. Particularly useful NGPs, or short stacks of graphene sheets, include grades H, M, and C of xGnP® NGPs, commercially available from XG Sciences, Inc., and N008-N, N008-P, and N006-P NGP materials, commercially available from Angstron Materials, Inc.

Preferably, the expandable graphite has an onset temperature (temperature at which it begins to expand) of at least 160° C. or more, alternately 200° C. or more, alternately 400° C. or more, alternately 600° C. or more, alternately 750° C. or more, alternately 1000° C. or more. Preferably the expandable graphite has an expansion ratio of at least 50:1 cc/g, preferably at least 100:1 cc/g, preferably at least 200:1 cc/g, preferably at least 250:1 cc/g at 600° C. Alternatively, the expandable graphite has an expansion ratio of at least 50:1 cc/g, preferably at least 100:1 cc/g, preferably at least 200:1 cc/g, preferably at least 250:1 cc/g at 150° C. The graphite may be expanded before it is combined with the other blend components or it may be expanded while blending with other blend components. Often, the graphite is not expanded (or expandable) after formation into an article (such as an air barrier, or a tire innerliner).

Preferably, the graphite is or comprises graphene. Graphene is a one-atom-thick planar sheet of $sp^2$-bonded carbon atoms that are densely packed in a honeycomb crystal lattice. The carbon-carbon bond length in graphene is approximately 1.42 angstroms. Graphene is the basic structural element of graphitic materials including graphite, as graphite can be considered to be many layers of graphene. Graphene can be prepared by micromechanical cleavage of graphite (e.g., removing flakes of graphene from graphite) or by exfoliation of intercalated graphitic compounds. Likewise, graphene fragments can be prepared through chemical modification of graphite. First, microcrystalline graphite is treated with a strongly acidic mixture of sulfuric acid and nitric acid. Then the material is oxidized and exfoliated resulting in small graphene plates with carboxyl groups at their edges. These are converted to acid chloride groups by treatment with thionyl chloride; next, they are converted to the corresponding graphene amide via treatment with octadecylamine. The resulting material (circular graphene layers of 5.3 angstrom thickness) is soluble in tetrahydrofuran, tetrachloromethane, and dichloroethane. (see Niyogi, et al. *Solution Properties of Graphite and Graphene, J. Am. Chem. Soc.*, 128(24), pp. 7720-7721 (2006).)

Alternatively, the graphite is present in the elastomer composition as dispersed nanosheets having a thickness of less than 100 nanometers, preferably less than 50 nanometers, preferably less than 30 nanometers.

Additional Fillers

In addition to the aforementioned nanofillers, the compounded elastomeric nanocomposite composition can be compounded and include one or more non-exfoliating fillers such as calcium carbonate, clay, mica, silica and silicates, talc, titanium dioxide, starch, and other organic fillers such as wood flour, and carbon black. These filler components are typically present at a level of from 10 to 200 phr of the compounded composition, more preferably from 40 to 140 phr. Preferably, two or more carbon blacks are used in combination, for example, Regal 85 is a carbon black that has multiple particle sizes, rather than just one. Combinations also include those where the carbon blacks have different surface areas. Likewise, two different blacks which have been treated differently may also be used. For example, a carbon black that has been chemically treated can be combined with a carbon black that has not.

The compounded elastomeric nanocomposite can include carbon black having a surface area of less than 35 $m^2/g$ and a dibutylphthalate oil absorption of less than 100 $cm^3/100$ g. Carbon blacks can include, but are not limited to N660, N762, N774, N907, N990, Regal 85, and Regal 90. Table 1 shows properties of useful carbon blacks.

TABLE 1

| Grade | SA ($m^2/g$) | DBP Absorption ($cm^3/100$ g) |
| --- | --- | --- |
| N660 | 34 | 90 |
| N754 | 25 | 58 |
| N762 | 26 | 64 |
| N774 | 28 | 70 |
| N787 | 30 | 80 |
| N907 | 10 | 38 |
| N990 | 7 | 42 |
| N991 | 10 | 38 |
| Regal 85 | 23 | 33 |
| Regal 90 | 23 | 32 |
| ARO 60 | 23 | 58 |
| SL 90 | 25 | 58 |

The carbon black having a surface area of less than 35 $m^2/g$ and a dibutylphthalate oil absorption of less than 100 $cm^3/100$ g is typically present in the nanocomposite at a level of from 10 to 200 phr, preferably 20 to 180 phr, more preferably 30 to 160 phr, and more preferably 40 to 140 phr.

Curing Agents, Processing Aids, and Accelerators

The compounded elastomeric nanocomposite composition can include one or more other components and cure additives customarily used in rubber mixes, such as pigments, accelerators, cross-linking and curing materials, antioxidants, antiozonants, and fillers. Preferably, processing aids (resins) such as naphthenic, aromatic or paraffinic extender oils can be present from 1 to 30 phr of the compounded composition. Alternatively, naphthenic, aliphatic, paraffinic and other aromatic resins and oils are substantially absent from the composition. By "substantially absent," it is meant that naphthenic, aliphatic, paraffinic, and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., The Post Vulcanization Stabilization for NR, Rubber World 18-23 (1991). Cross-linking and curing agents include sulfur, zinc oxide, and organic fatty acids. Peroxide cure systems may also be used. Generally, polymer compositions can be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and either a sulfur compound or an alkylperoxide compound. (See also, *Formulation Design and Curing Characteristics of NBR Mixes for Seals*, Rubber World 25-30 (1993). This method can be accelerated and is often used for the vulcanization of elastomer compositions.

Accelerators include amines, guanidines, thioureas, thiazoles, thiurams, sulfenamides, sulfenimides, thiocarbamates, xanthates, and the like. Acceleration of the cure process can be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), alkyl disulfides, such as tetrabutylthiuram disulfide (TBTD) and 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc 2-ethyl hexanoate (ZEH), and N,N'-diethyl thiourea.

Preferably, at least one curing agent is present from 0.2 to 15 phr of the compounded composition, or from 0.5 to 10 phr. Curing agents include those components described above that facilitate or influence the cure of elastomers, such as metals, accelerators, sulfur, peroxides, and other agents common in the art, as described above.

Processing

Mixing of the components to form the elastomeric nanocomposite composition and/or compounding of the elastomeric nanocomposite composition can be carried out by combining the components in any suitable internal mixing device such as a Banbury™ mixer, BRABENDER™ mixer or extruder (e.g., a single screw extruder or twin screw extruder). Mixing can be performed at temperatures up to the melting point of the elastomers and/or rubbers used in the composition at a rate sufficient to allow the graphite and/or graphene to become uniformly dispersed within the polymer to form the nanocomposite.

Suitable mixing rates can range from about 10 RPM to about 8,500 RPM. Preferably, the mixing rate can range from a low of about 10 RPM, 30 RPM, or 50 RPM to a high of about 500 RPM, 2,500 RPM, or 5,000 RPM. More preferably, the mixing rate can range from a low of about 10 RPM, 30 RPM, or 50 RPM to a high of about 200 RPM, 500 RPM, or 1,000 RPM.

The mixing temperature can range from about 40° C. to about 340° C. Preferably, the mixing temperature can range from about 80° C. to 300° C. More preferably, the mixing temperature can range from a low of about 30° C., 40° C., or 50° C. to a high of about 70° C., 170° C., or 340° C. More preferably, the mixing temperature can range from a low of about 80° C., 90° C., or 100° C. to a high of about 120° C., 250° C., or 340° C. Ideally, the mixing temperature can range from a low of about 85° C., 100° C., or 115° C. to a high of about 270° C., 300° C., or 340° C.

Often, 70% to 100% of the one or more elastomer components along with the one or more PAH functionalized copolymer nanofiller dispersants can be mixed at a rate noted above for 20 to 90 seconds, or until the temperature reaches from 40° C. to 60° C. Then, 75% to 100% of the nanofiller, and the remaining amount of elastomer and/or nanofiller dispersant, if any, can be added to the mixer, and mixing can continue until the temperature reaches from 90° C. to 150° C. Next, any remaining nanofiller and/or additional fillers can be added, as well as processing oil, and mixing can continue until the temperature reaches from 140° C. to 190° C. The finished mixture can then be finished by sheeting on an open mill and allowed to cool to from 60° C. to 100° C. when the curatives are added.

The composition described herein may be incorporated into articles, such as films, sheets, molded parts and the like. Specifically the composition described herein may be formed into tires, tires parts (such as sidewalls, treads, tread cap, innertubes, innerliners, apex, chafer, wirecoat, and ply coat), tubes, pipes, barrier films/membranes, or any other application where air impermeability would be advantageous.

Preferably, articles formed from the elastomeric compositions described herein have a permeability of 200 mm-cc/$M^2$-day or less, preferably 190 mm-cc/$M^2$-day or less, preferably 180 mm-cc/$M^2$-day or less, preferably 170 mm-cc/$M^2$-day or less, preferably 160 mm-cc/$M^2$-day or less, preferably 155 mm-cc/$M^2$-day or less, as determined on a MOCON OX-TRAN 2/61 permeability tester at 40° C. as described below.

EXAMPLES

The foregoing discussion can be further described with reference to the following non-limiting examples.

Preparation of Example Copolymers 1-5

Five examples of PAH functionalized isobutylene copolymers (Examples 1-5) were prepared. To prepare each of the example copolymers, 20 g of the halogenated copolymer electrophile (brominated poly(isobutylene-co-para-methylstyrene)) (BIMSM) having 7.5 wt % p-methylstyrene units, 1.2 mol % benzylic bromine functionality, and Mooney Viscosity of 45±5, was first dissolved in 200 mL of oDCB (ortho-1,2 dichlorobenzene) under nitrogen protection in a 500 mL 3-neck round bottom flask equipped with a condenser at 120° C. The BIMSM elastomer that was used for each example copolymer is commercially available as EXX-PRO™ 3745 from ExxonMobil Chemical Company.

Afterward, Component A (a PAH nucleophile) and Component B (a Lewis base) were added to the oDCB. The composition and quantities of these components for each example copolymer are listed in Table 2.

TABLE 2

| Example | Component A | Component B |
| --- | --- | --- |
| 1 | 1.15 g methylamino pyrene | 0.5 g MgO |
| 2 | 1 g pyrene methanol | 0.2 g NaH mineral solution |
| 3 | 1.2 g pyrene butanol | 0.2 g NaH mineral solution |
| 4 | 1.5 g pyrene methanol | 0.6 g NaH mineral solution |
| 5 | 1.8 g pyrene butanol | 0.6 g NaH mineral solution |

For each of Examples 1-5, Component A was added by dissolving/dispersing this component in the oDCB. For Examples 1-3, Component B was added in the same manner. For Examples 4-5, Component B was gradually introduced at 0.1 g per addition up to a final quantity of 0.6 g. It should be noted that a further enhancement in reaction time could have been accomplished by separately reacting Components A and B in oDCB at room temperature and then adding the resulting pre-activated solution to the electrophile solution. Only 30 minutes or less of grafting time would have been needed if Components A and B had been pre-activated in this manner.

The nucleophilic substitution reaction between the halogenated copolymer electrophile and Component A for each example copolymer was run for four hours under reflux. Next, the reaction mixture was precipitated in 1 L of isopropanol while the mixture was still warm. Finally, the reaction mixture was washed with fresh isopropanol and dried in a vacuum oven at 60° C. until the mixture reached a constant weight.

Characterization of Example Copolymers 1-5

Examples 1-5 were characterized by proton nuclear magnetic resonance ($^1$H NMR). NMR spectra were acquired using a 500 MHz spectrometer obtained from Bruker Corporation, with 1,1,2,2-tetrachloroethane-$d_2$ (TCE-$d_2$) used as the solvent. As shown in Table 3, the acquired NMR spectra were compared to those of the starting materials to determine the amount of grafting between the halogenated copolymer electrophile and the Component A copolymer in each example, with the amount of grafting corresponding to the percentage of the benzylic bromine functionality in the electrophile that covalently bonded with Component A.

TABLE 3

| Example | Component A | Amount of Grafting (%) |
| --- | --- | --- |
| 1 | 1.15 g methylamino pyrene | — |
| 2 | 1 g pyrene methanol | 4% |
| 3 | 1.2 g pyrene butanol | 14% |
| 4 | 1.5 g pyrene methanol | 70% |
| 5 | 1.8 g pyrene butanol | 71% |

As can be seen in Table 3, the amount of grafting between the halogenated copolymer electrophile and Component A in Example 1 was not recorded because the continued reactivity of the secondary amine from Component A remaining after the nucleophilic substitution reaction caused gelation of the functionalized example copolymer. Hence, subsequent graphene dispersion evaluation using Example 1 could not be conducted. Gelation was avoided in the remaining example copolymers by selecting a monofunctional pyrene for Component A in Examples 2-5.

As also shown in Table 3, using a stoichiometric excess of Component A over the benzylic-halide moiety for Examples 4 and 5 resulted in a substantially higher amount of grafting in these example copolymers than in Examples 2 and 3.

Preparation of Nanocomposites from Examples 2-5

Four brominated poly(isobutylene-co-isoprene) (BIIR) based nanocomposites comprising 3 wt % nano graphene platelets (NGPs) and one of Examples 2-5 as the NGP dispersant were prepared.

To prepare each of the nanocomposites, 15 g of the example copolymer was first dissolved in 500 mL of oDCB under nitrogen protection in a 1 L 3-neck round bottom flask equipped with a condenser at 120° C. Afterward, 1.5 g of grade C xGnP® nano graphene platelets having an average surface area of 500 m²/g and a density of from 2-2.25 g/cc, commercially available from XG Sciences, Inc., was added and the solution was sonicated for 5 minutes. Then, 35 g of Bromobutyl 2222 grade BIIR elastomer, commercially available from ExxonMobil Chemical Company, was dissolved in the oDCB. After complete dissolution of the BIIR elastomer, the components were mixed under reflux for 2 hours. Next, the mixture was precipitated in 2 L of isopropanol while the mixture was still warm. Finally, the mixture was filtered, washed with fresh isopropanol and dried in a vacuum oven at 60° C.

Compounding of Nanocomposites from Examples 2-5

To compound each of the four nanocomposites comprising Examples 2-5, 36 g of the nanocomposite was first charged into a BRABENDER® mixer at 135° C. and 60 RPM. After 1 minute, 20 g of N660 Carbon Black (CB) fillers were added. The mixing was then continued for another 6 minutes for a total mix time of 7 minutes.

The nanocomposite was then removed, cut up, and fed back into the BRABENDER® mixer at 45° C. and 40 RPM. After 1 minute, 0.33 g MBTS (Mercaptobenzothiazole disulfide), 0.33 g zinc oxide, and 0.33 g stearic acid curatives were added. The mixing was then continued for another 3 minutes for a total mix time of 4 minutes.

Comparative Example Copolymer & Nanocomposite

A neat Bromobutyl 2222 grade BIIR compound was used as the Comparative Example copolymer. A comparative nanocomposite was prepared by mixing the Comparative Example copolymer directly with xGnP® nano graphene platelets without the aid of a nanofiller dispersant. The preparation and compounding procedures for the nanocomposite comprising the Comparative Example were the same as those used for the nanocomposites comprising Examples 2-5.

Characterization of Example & Comparative Example Nanocomposites

The four nanocomposites comprising Examples 2-5, the nanocomposite comprising the Comparative Example, and the Comparative Example copolymer were pressed in between Teflon® sheets and molded/cured at 170° C. for 15 minutes. The resulting cure pads were then used for property measurements and for dispersion characterization.

After the nanocomposites and the Comparative Example copolymer were pressed and cured, their oxygen permeability values were measured using a MOCON OX-TRAN 2/61 permeability tester at 40° C., with the results recorded in Table 4.

TABLE 4

| Run | Compound | Permeability (mm-cc/(M²-day) | Reduction in Permeability (%) |
|---|---|---|---|
| 1 | Comparative Example | 142 | — |
| 1 | Comparative Example Nanocomposite | 167 | −17.6% |
| 2 | Comparative Example | 185 | — |
| 2 | Example 4 Nanocomposite | 156 | 15.7% |
| 2 | Example 5 Nanocomposite | 157 | 15.2% |
| 3 | Comparative Example | 183 | — |
| 3 | Example 4 Nanocomposite | 152 | 17.0% |

As shown in Table 4, the nanocomposites comprising 3 wt % nano graphene platelets dispersed using Example 4 and Example 5 exhibited a 15 to 17% reduction in permeability over the neat BIIR elastomer Comparative Example copolymer, indicating that a high degree of NGP dispersion was achieved in these nanocomposites. In contrast, the nanocomposite comprising 3 wt % nano graphene platelets dispersed directly in the Comparative Example copolymer without the aid of an example copolymer nanofiller dispersant resulted in an 18% increase in permeability over the neat BIIR elastomer, indicating that a low degree of NGP dispersion was achieved in this nanocomposite.

Having described and demonstrated the various aspects of the inventive polycyclic aromatic hydrocarbon functionalized isobutylene copolymers for dispersing graphene and graphite, described here in numbered paragraphs is:

P1. A nanofiller dispersant composition comprising: (a) the reaction product of at least one halogenated copolymer comprising units derived from isoolefins having from 4 to 7 carbons and a para-alkylstyrene, and at least one polycyclic aromatic hydrocarbon (PAH); and (b) at least one nanofiller.

P2. The composition of previous numbered paragraph 1, wherein the PAH is polynuclear.

P3. The composition of numbered paragraph 2, wherein the PAH is selected from the group consisting of anthracenes, pyrenes, benzopyrenes, coronenes, ovalenes, and combinations thereof.

P4. The composition of any one of the previous numbered paragraphs, wherein the halogenated copolymer is brominated poly(isobutylene-co-p-methylstyrene) (BIMSM), wherein the BIMSM comprises a benzylic bromine functionality, and wherein from 4% to 75% of the benzylic bromine functionality is covalently bonded to the PAH.

P5. The composition of any one of the previous numbered paragraphs, wherein the PAH comprises a functional group.

P6. The composition of numbered paragraph 5, wherein the functional group is selected from the group consisting of amines, alcohols, aldehydes, alkoxides, alkenes, carboxylic acids, thiols, acid halides, acid anhydrides, aziridines, epoxides, amides, and combinations thereof.

P7. The composition of numbered paragraph 6, wherein the functional group is selected from the group consisting of alkyl amines, alkyl alcohols, aminopyrenes, pyrene alcohols, pyrene aldehydes, cyano-pyrenes, and combinations thereof.

P8. A method for producing a nanofiller dispersant composition, the method comprising: (a) combining at least one halogenated copolymer comprising units derived from isoolefins having from 4 to 7 carbons and a para-alkylstyrene, and at least one PAH to produce a reaction product, wherein the at least one halogenated copolymer and the at least one PAH are combined in a solvent under basic conditions at a temperature ranging from 30° C. to 150° C.; and (b) mixing the reaction product with at least one nanofiller.

P9. The method of numbered paragraph 8, wherein the PAH is polynuclear.

P10. The method of any one of previous numbered paragraphs 8 to 9, wherein the solvent is selected from the group consisting of $C_6$ to $C_8$ aliphatic hydrocarbons, $C_6$ to $C_{20}$ aryls, halogenated $C_6$ to $C_{20}$ aryls, and mixtures thereof.

P11. The method of any one of previous numbered paragraphs 8 to 10, wherein the halogenated copolymer is BIMSM.

P12. The method of any one of previous numbered paragraphs 8 to 11, wherein the PAH comprises a functional group selected from the group consisting of amines, alcohols, aldehydes, alkoxides, alkenes, carboxylic acids, thiols, acid halides, acid anhydrides, aziridines, epoxides, amides, and combinations thereof.

P13. The method of any one of previous numbered paragraphs 8 to 12, further comprising mixing and/or blending the nanofiller dispersant composition with at least one halogenated elastomer component comprising units derived from isoolefins having from 4 to 7 carbons to obtain an elastomeric nanocomposite composition, wherein the nanocomposite composition comprises from 0.01 wt % to 15.0 wt % of the nanofiller and from 0.5 wt % to 45 wt % of the nanofiller dispersant based on the weight of the uncompounded nanocomposite, preferably wherein the weight of the uncompounded nanocomposite is the total weight of the nanofiller dispersant, the elastomer component, and the nanofiller, and optionally wherein the blending is performed in a solvent or in a mixer at a temperature ranging from 50° C. to 170° C.

P14. The method of any one of previously numbered paragraphs 8 to 13, wherein the nanofiller is selected from the group consisting of graphite, expanded graphite, nano graphene platelets (NGPs), graphene, and mixtures thereof.

P15. The method of any one of previous numbered paragraphs 13 to 14, wherein the halogenated elastomer component is selected from the group consisting of chlorinated poly (isobutylene-co-isoprene) (CIIR), brominated poly (isobutylene-co-isoprene) (BIIR), and mixtures thereof.

P16. The method of numbered paragraph 15, wherein the oxygen permeability of the elastomeric nanocomposite at 40° C. is at least 15% lower than the permeability of the halogenated elastomer component.

P17. An elastomeric nanocomposite composition comprising: a nanofiller dispersant comprising the reaction product of at least one halogenated copolymer comprising units derived from isoolefins having from 4 to 7 carbons and a para-alkylstyrene, and at least one PAH; at least one halogenated elastomer component comprising units derived from isoolefins having from 4 to 7 carbons; and at least one nanofiller, wherein the nanofiller dispersant is present from 0.5 wt % to 45 wt % based on the weight of the uncompounded nanocomposite and wherein the nanofiller is present at from 0.011 wt % to 15.0 wt % based on the weight of the uncompounded nanocomposite, preferably wherein the weight of the uncompounded nanocomposite is the total weight of the nanofiller dispersant, the elastomer component, and the nanofiller.

P18. The composition of numbered paragraph 17, wherein the PAH is polynuclear.

P19. The composition of any one of previous numbered paragraphs 17 to 18, wherein the nanofiller is selected from the group consisting of graphite, expanded graphite, NGPs, graphene, and mixtures thereof.

P20. The composition of any one of previous numbered paragraphs 17 to 19, wherein the elastomer component is selected from the group consisting of CIIR, BIIR, and mixtures thereof.

P21. The composition of numbered paragraph 20, wherein the oxygen permeability of the elastomeric nanocomposite at 40° C. is at least 15% lower than the permeability of the elastomer component.

P22. The composition of any one of previous numbered paragraphs 17 to 21, wherein the halogenated copolymer is BIMSM.

P23. The composition of any one of previous numbered paragraphs 17 to 22, wherein the PAH comprises a functional group selected from the group consisting of amines, alcohols, aldehydes, alkoxides, alkenes, carboxylic acids, thiols, acid halides, acid anhydrides, aziridines, epoxides, amides, and combinations thereof.

P24. The composition of any one of previous numbered paragraphs 17 to 23, further comprising at least one component selected from the group consisting of additional fillers, processing oils, cure additives, and mixtures thereof, wherein the cure additives are selected from the group consisting of metal oxides, organic acids, alkyl disulfides, and mixtures thereof.

P25. An innerliner for a tire comprising the composition of any one of previous numbered paragraphs 17 to 24.

Also disclosed herein is the use of the nanofiller dispersant described herein in a tire innerliner. Also disclosed herein, is the use of a PAH with a halogenated copolymer as a nanofiller dispersant in an elastomeric nanocomposite composition.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated. The term "comprising" is synonymous with the term "including." Likewise, whenever a composition, an element or a group of components is preceded with the transitional phrase "comprising," it is understood that we also contemplate the same composition or group of components with transitional phrases "consisting essentially of," "consisting of," "selected from the group of consisting of," or "is" preceding the recitation of the composition, component, or components, and vice versa.

For all jurisdictions in which the doctrine of "incorporation by reference" applies, all of the test methods, patent publications, patents and reference articles are hereby incorporated by reference either in their entirety or for the relevant portion for which they are referenced.

comprising the composition of any one of previous numbered paragraphs 17 to 24.

What is claimed is:

1. A nanofiller dispersant composition comprising:
   (a) the reaction product of: (i) at least one halogenated copolymer comprising units derived from isoolefins having from 4 to 7 carbons and a para-alkylstyrene; and
   (ii) at least one polycyclic aromatic hydrocarbon (PAH); and
   (b) at least one nanofiller.

2. The composition of claim 1, wherein the PAH is polynuclear.

3. The composition of claim 2, wherein the PAH is selected from the group consisting of anthracenes, pyrenes, benzopyrenes, coronenes, ovalenes, and combinations thereof.

4. The composition of claim 1,
   wherein the halogenated copolymer is brominated poly (isobutylene-co-p-methylstyrene) (BIMSM), wherein the BIMSM comprises a benzylic bromine functionality, and
wherein from 4% to 80% of the benzylic bromine functionality is covalently bonded to the PAH.

5. The composition of claim 1, wherein the PAH comprises a functional group.

6. The composition of claim 5, wherein the functional group is selected from the group consisting of an amine group, an alcohol group, an aldehyde group, an alkoxide group, an alkene group, a carboxylic acid group, a thiol group, an acid halide group, an acid anhydride group, an aziricline group, an epoxide group, an amide group, and combinations thereof.

7. A method for producing a nanofiller dispersant composition, the method comprising:
(a) combining
    (i) at least one halogenated copolymer comprising units derived from isoolefins having from 4 to 7 carbons and a para-alkylstyrene; and
    (ii) at least one polycyclic aromatic hydrocarbon (PAH)
    in a solvent under basic conditions at a temperature ranging from 30° C. to 150° C. to produce a reaction product; and
(b) mixing the reaction product with at least one nanofiller.

8. The method of claim 7, wherein the PAH is polynuclear.

9. The method of claim 7, wherein the solvent is selected from the group consisting of $C_6$ to $C_8$ aliphatic hydrocarbons, $C_6$ to $C_{20}$ aryls, halogenated $C_6$ to $C_{20}$ aryls, and mixtures thereof.

10. The method of claim 7, wherein the halogenated copolymer is brominated poly(isobutylene-co-p-methylstyrene) (BIMSM).

11. The composition of claim 7, wherein the PAH comprises a functional group selected from the group consisting of an amine group, an alcohol group, an aldehyde group, an alkoxide group, an alkene group, a carboxylic acid group, a thiol group, an acid halide group, an acid anhydride group, an aziridine group, an epoxide group, an amide group, and combinations thereof.

12. The method of claim 7, further comprising mixing the nanofiller dispersant composition with at least one halogenated elastomer component comprising units derived from isoolefins having from 4 to 7 carbons to obtain an elastomeric nanocomposite composition, wherein the nanocomposite composition comprises from 0.01 wt % to 15.0 wt % of the nanofiller and from 0.5 wt % to 45 wt % of the nanofiller dispersant, wherein the weight percentages are based on the total weight of the nanofiller dispersant, the elastomer component, and the nanofiller.

13. The method of claim 7, wherein the nanofiller is selected from the group consisting of graphite, expanded graphite, nano graphene platelets (NGPs), graphene, and mixtures thereof.

14. The method of claim 12, wherein the halogenated elastomer component is selected from the group consisting of chlorinated poly(isobutylene-co-isoprene) (CIIR), brominated poly(isobutylene-co-isoprene) (BIIR), and mixtures thereof.

15. The method of claim 14, wherein the oxygen permeability of the elastomeric nanocomposite at 40° C. is at least 15% lower than the permeability of the halogenated elastomer component.

16. An elastomeric nanocomposite composition comprising:
(a) a nanofiller dispersant comprising the reaction product of
    (i) at least one halogenated copolymer comprising units derived from isoolefins having from 4 to 7 carbons and a para-alkylstyrene; and
    (ii) at least one polycyclic aromatic hydrocarbon (PAH),
(b) at least one halogenated elastomer component comprising units derived from isoolefins having from 4 to 7 carbons; and
(c) at least one nanofiller,
wherein the nanofiller dispersant is present from 0.5 wt % to 45 wt % based on the total weight of the nanofiller dispersant, the elastomer component, and the nanofiller;
and wherein the nanofiller is present at from 0.01 wt % to 15.0 wt % based on the total weight of the nanofiller dispersant, the elastomer component, and the nanofiller.

17. The composition of claim 16, wherein the PAH is polynuclear.

18. The composition of claim 16, wherein the nanofiller is selected from the group consisting of graphite, expanded graphite, NGPs, graphene, and mixtures thereof.

19. The composition of claim 16, wherein the halogenated elastomer component is selected from the group consisting of chlorinated poly(isobutylene-co-isoprene) (CIIR), brominated poly(isobutylene-co-isoprene) (BIIR), and mixtures thereof.

20. The composition of claim 19, wherein the oxygen permeability of the elastomeric nanocomposite at 40° C. is at least 15% lower than the permeability of the halogenated elastomer component.

21. The composition of claim 16, wherein the halogenated copolymer is brominated poly(isobutylene-co-p-methylstyrene) (BIMSM).

22. The composition of claim 16, wherein the PAH comprises a functional group selected from the group consisting of an amine group, an alcohol group, an aldehyde group, an alkoxide group, an alkene group, a carboxylic acid group, a thiol group, an acid halide group, an acid anhydride group, an aziridine, group, an epoxide group, an amide group, and combinations thereof.

23. The composition of claim 16, further comprising at least one component selected from the group consisting of additional fillers, processing oils, cure additives, and mixtures thereof, wherein the cure additives are selected from the group consisting of metal oxides, organic acids, alkyl disulfides, and mixtures thereof.

24. An innerliner for a tire comprising the composition of claim 16.

* * * * *